(12) United States Patent
Shirakawa

(10) Patent No.: US 10,801,620 B2
(45) Date of Patent: Oct. 13, 2020

(54) VEHICLE BRAKE CONTROL APPARATUS

(71) Applicant: TOYOTA JIDOSHA KABUSHIKI KAISHA, Toyota-shi, Aichi-ken (JP)

(72) Inventor: Shinya Shirakawa, Toyota (JP)

(73) Assignee: TOYOTA JIDOSHA KABUSHIKI KAISHA, Toyota-shi, Aichi-ken (JP)

( * ) Notice: Subject to any disclaimer, the term of this patent is extended or adjusted under 35 U.S.C. 154(b) by 0 days.

(21) Appl. No.: 16/394,544

(22) Filed: Apr. 25, 2019

(65) Prior Publication Data
US 2019/0331221 A1 Oct. 31, 2019

(30) Foreign Application Priority Data

Apr. 26, 2018 (JP) .................................. 2018-085645

(51) Int. Cl.
| | | |
|---|---|---|
| *B60T 7/10* | (2006.01) | |
| *F16H 63/34* | (2006.01) | |
| *B60T 11/10* | (2006.01) | |
| *B60T 8/18* | (2006.01) | |
| *F16H 61/22* | (2006.01) | |

(52) U.S. Cl.
CPC .......... *F16H 63/3491* (2013.01); *B60T 7/107* (2013.01); *B60T 8/1881* (2013.01); *B60T 11/10* (2013.01); *B60T 2270/40* (2013.01); *F16H 2061/223* (2013.01)

(58) Field of Classification Search
CPC ........... F16H 63/3491; F16H 2061/223; B60T 7/107; B60T 7/045; B60T 8/1881; B60T 8/321; B60T 8/92; B60T 11/10; B60T 2270/40
See application file for complete search history.

(56) References Cited

U.S. PATENT DOCUMENTS

| | | | | |
|---|---|---|---|---|
| 6,702,405 B1* | 3/2004 | Balz | ........................ | B60T 7/107 303/192 |
| 7,358,864 B2* | 4/2008 | Mori | ........................ | B60T 7/12 180/275 |
| 8,746,419 B2* | 6/2014 | Roll | ........................ | B60T 7/042 188/106 R |
| 9,221,446 B2* | 12/2015 | Kinder | ..................... | B60T 7/12 |

(Continued)

FOREIGN PATENT DOCUMENTS

| | | |
|---|---|---|
| JP | 2009-166656 A | 7/2009 |
| JP | 2013-112017 A | 6/2013 |

*Primary Examiner* — Thomas W Irvin
(74) *Attorney, Agent, or Firm* — Sughrue Mion, PLLC

(57) ABSTRACT

When an ON operation of an electric parking brake apparatus is performed when a vehicle is moving, a vehicle brake control apparatus executes an EPB stop process in order to stop the vehicle by braking force generated by a hydraulic brake apparatus. If a hydraulic brake malfunction wheel, at which the hydraulic brake apparatus cannot generate braking force properly, is detected during a time period from the beginning of the EPB stop process to the stop of said vehicle, the vehicle brake control apparatus makes the hydraulic brake apparatus stop generating braking force at wheels including the hydraulic brake malfunction wheel. Meanwhile, the vehicle brake control apparatus makes the electric parking brake apparatus start generating braking force at a rear wheel. Subsequently, the vehicle brake control apparatus makes the electric parking brake apparatus start generating braking force to the other rear wheel.

6 Claims, 7 Drawing Sheets

(56) References Cited

U.S. PATENT DOCUMENTS

| | | | | |
|---|---|---|---|---|
| 9,409,552 | B2* | 8/2016 | Sundaram | B60T 7/042 |
| 9,511,757 | B2* | 12/2016 | Baehrle-Miller | B60T 13/588 |
| 10,343,666 | B2* | 7/2019 | Mannherz | B60T 7/042 |
| 2004/0140710 | A1* | 7/2004 | Alvarez | B60T 7/085 |
| | | | | 303/20 |
| 2011/0004386 | A1* | 1/2011 | Kinder | B60W 10/182 |
| | | | | 701/70 |
| 2012/0090928 | A1* | 4/2012 | Roll | B60T 7/042 |
| | | | | 188/106 R |
| 2013/0138316 | A1 | 5/2013 | Koyama | |
| 2013/0231839 | A1* | 9/2013 | Baehrle-Miller | B60T 13/745 |
| | | | | 701/70 |
| 2014/0067221 | A1* | 3/2014 | Sundaram | B60T 7/085 |
| | | | | 701/70 |
| 2018/0215384 | A1* | 8/2018 | Mannherz | B60W 10/06 |
| 2020/0023823 | A1* | 1/2020 | Baehrle-Miller | B60T 13/741 |

* cited by examiner

FIG. 2(A) Operation States of EPB Switch
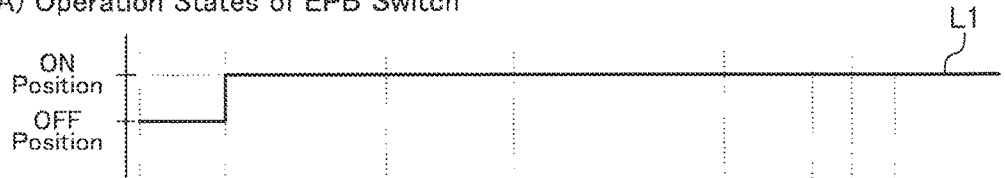
FIG. 2(B) Operation States of Hydraulic Brake
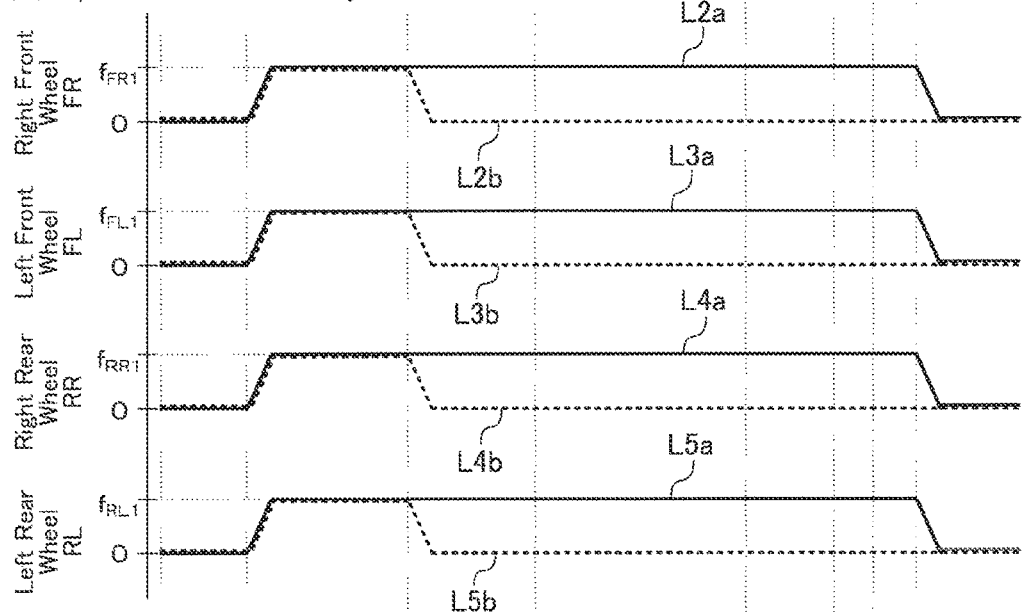
FIG. 2(C) Vehicle Speed Vs
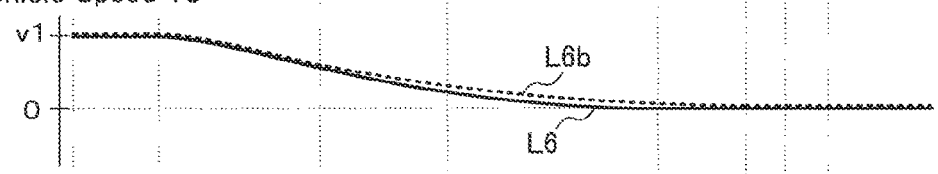
FIG. 2(D) Operation States of EPB
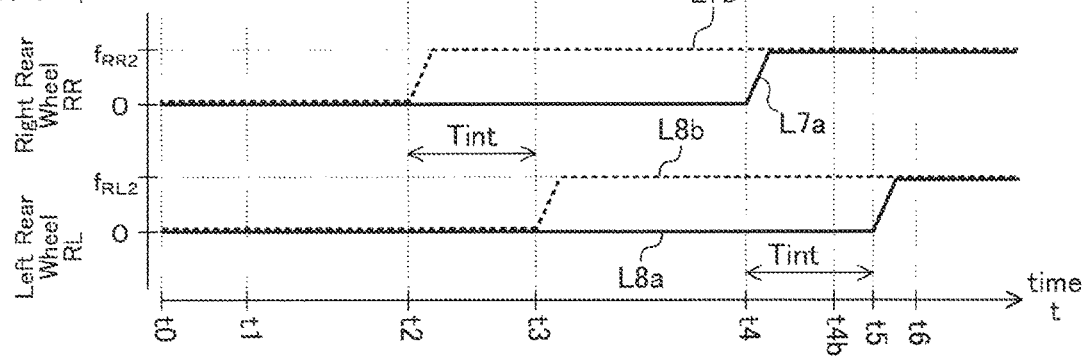

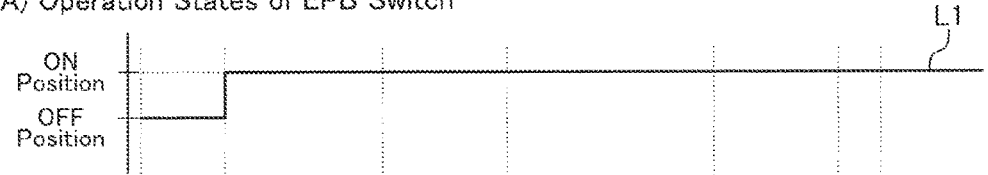
FIG. 3(A) Operation States of EPB Switch
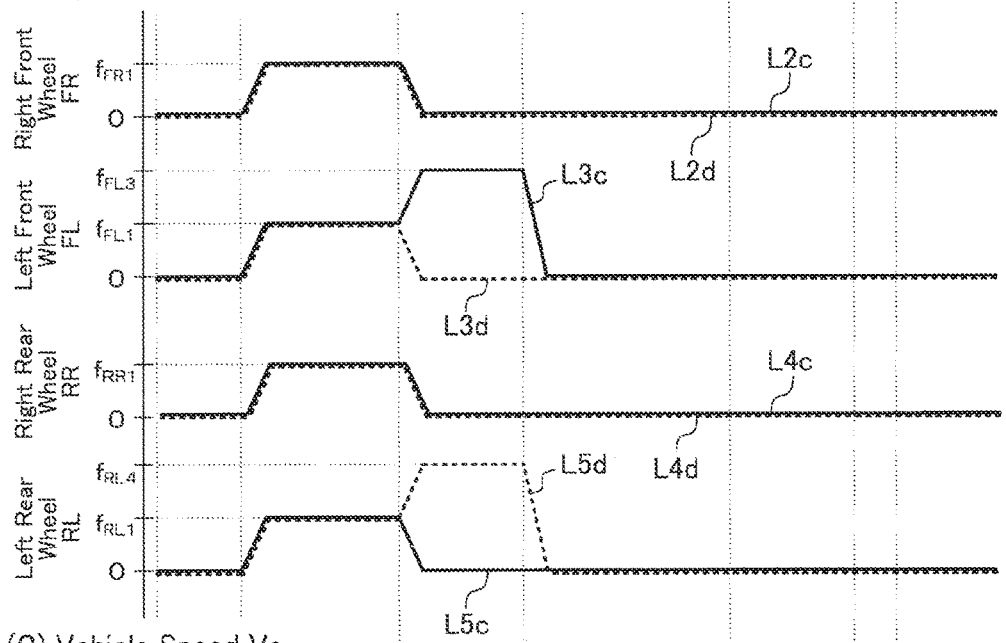
FIG. 3(B) Operation States of Hydraulic Brake
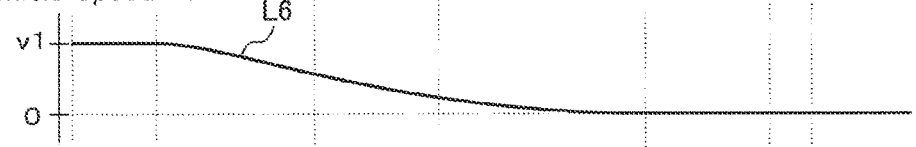
FIG. 3(C) Vehicle Speed Vs
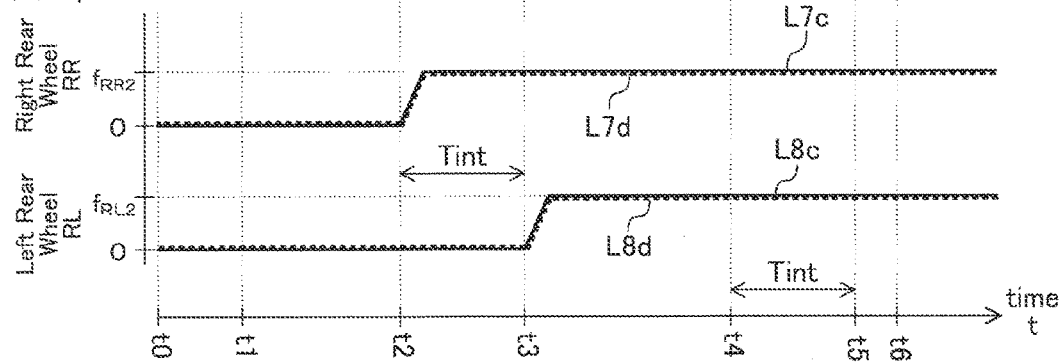
FIG. 3(D) Operation States of EPB

VEHICLE BRAKE CONTROL APPARATUS

BACKGROUND OF THE DISCLOSURE

Field of the Disclosure

The present disclosure relates to a vehicle brake control apparatus which is applied to a vehicle which is equipped with a hydraulic brake apparatus and an electric parking brake apparatus.

Description of the Related Art

A vehicle which is equipped with a hydraulic brake apparatus and a parking brake apparatus is known. The hydraulic brake apparatus is disposed at each of four wheels which are provided in the vehicle, and generates braking force by driving a brake actuator using pressure of hydraulic oil (brake fluid). The hydraulic brake apparatus is mainly used for decelerating the vehicle. On the other hand, the parking brake apparatus is disposed at each of two rear wheels of the vehicle, and mainly used for maintaining the vehicle in a stop state.

Further, an electric parking brake apparatus in which an electrical motor is utilized as an actuator of the parking brake apparatus is known. In substitution for a foot pedal and a hand lever, an electric switch operated by a driver of the vehicle (hereinafter also referred to as an "EPB switch") is used as an operating device of the electric parking brake apparatus.

One of a vehicle brake control apparatus which controls the hydraulic brake apparatus and the electric parking brake apparatus (hereinafter also referred to as a "conventional apparatus") executes an "EPB stop process," when a predetermined ON operation with the EPB switch is performed by the driver while the vehicle is traveling/moving. According to the EPB stop process, the conventional apparatus stops the vehicle by use of braking force generated by the hydraulic brake apparatus, and makes/lets the electric parking brake apparatus generate braking force after the vehicle sopped (see, for example, Japanese Patent Application Laid-Open (kokai) No. 2013-112017).

SUMMARY OF THE DISCLOSURE

Incidentally, in some cases, the electric parking brake apparatus cannot generate braking force at both of the pair of the rear wheels at the same time. More specifically, when application of voltage to the electric motor which is utilized as the actuator starts in order to switch the electric parking brake apparatus from an OFF state to an ON state, electric current of the motor may become excessive (namely, a rush current may occur). The OFF state is a state where the electric parking brake apparatus does not make/let the rear wheels generate braking force. The ON state is a state where the electric parking brake apparatus makes/lets the rear wheels generate braking force.

Consequently, in the case where the electric parking brake apparatus starts having both of the rear wheels generate braking forces simultaneously, electric current of each of the two motors may become excessive at the same time. If this happens, sufficient electric power may not be supplied to electronical devices on the vehicle other than the motors of the electric parking brake. That is, "temporary failure of power supply" may occur.

In addition, there is a possibility that failure of the hydraulic brake apparatus occurs during a time period from a time point at which the EPB stop process is started to a time point at which the vehicle stops. In the case where the failure of the hydraulic brake apparatus occurs during the time period, a distance required to the stop of the vehicle (namely, braking distance) may become longer as compared to a case where the failure of the hydraulic brake apparatus does not occur.

However, the conventional apparatus does not take into account the temporary failure of power supply and the occurrence of failure of the hydraulic brake apparatus during execution of the EPB stop process.

In view of the forgoing, one object of the present disclosure is to provide a vehicle brake control apparatus configured to be able to avoid occurrence of the temporary failure of power supply and to prevent the increase in the braking distance as much as possible, even when the hydraulic brake apparatus fails during execution of the EPB stop process.

A vehicle brake control apparatus which achieves the above-described object (hereinafter also referred to as "the apparatus of the present disclosure") is applied to a vehicle (10) which is equipped with a hydraulic brake apparatus (a hydraulic brake 30) capable of generating braking force at each of four wheels consisting of a pair of right and left front wheels and a pair of right and left rear wheels and an electric parking brake apparatus (an electric parking brake 40) capable of generating braking force at each of a pair of the rear wheels.

In addition, the apparatus of the present disclosure comprises an operation switch (an EPB switch 60), a braking control section (a brake ECU 20) and an EPB stop process execution section (the brake ECU 20).

The operation switch is disposed at a position where a driver of the vehicle can reach, and the driver can perform a predetermined "ON operation" with the operation switch.

The braking control section is configured to control "hydraulic braking force" and "EPB braking force,"

the hydraulic braking force being generated by the hydraulic brake apparatus, and the EPB braking force being generated by the electric parking brake apparatus.

The EPB stop process execution section is configured to execute an EPB stop process when the ON operation is performed while the vehicle is moving ("Yes" determination in step 430 of FIG. 4), the EPB stop process being a process to generate a predetermined magnitude of the hydraulic braking force at each of the four wheels, and to generate the EPB braking force at each of a pair of the rear wheels after the vehicle stops moving.

Further, the EPB stop process execution section is configured to start executing a "specific brake process" when at least one of the four wheels is determined to be a "hydraulic brake malfunction wheel" during a time period from a time point at which the EPB stop process is started to a time point at which the vehicle stops moving ("Yes" determination in step 510 of FIG. 5).

The specific brake process includes a "first process" executed when the specific brake process is started and a "second process" executed when a predetermined time period (Tint) elapses after the first process is started, the first process being a process to start generating the EPB braking force at a "preceding brake wheel" (step 635 of FIG. 6) and to stop generating the hydraulic braking force at one or more of "hydraulic brake release wheels" including the hydraulic brake malfunction wheel (step 630 of FIG. 6), the second process being a process to start generating the EPB braking force at a "succeeding brake wheel" (step 710 of FIG. 7), the hydraulic brake malfunction wheel being a wheel at which the hydraulic brake apparatus cannot generate the predetermined magnitude of the hydraulic braking force, the preceding brake wheel being one of a pair of the rear wheels, and the succeeding brake wheel being the other of a pair of the rear wheels.

When the hydraulic brake malfunction wheel is detected as a result of failure of the hydraulic brake apparatus while the EPB stop process is being executed, the apparatus of the present disclosure makes/lets the hydraulic brake apparatus stop generating braking force at the "hydraulic brake release wheels including the hydraulic brake malfunction wheel." Meanwhile, in this case, the apparatus of the present disclosure makes/lets the electric parking brake apparatus start generating braking force at the preceding brake wheel.

Subsequently, when the predetermined time period elapses, the apparatus of the present disclosure makes/lets the electric parking brake apparatus start generating braking force at the succeeding brake wheel. In other words, "the start time of generating braking force by the electric parking brake apparatus at one of the rear wheels" and "the start time of generating braking force by the electric parking brake apparatus at the other of the rear wheels" are separated in time from each other by the predetermined time.

This predetermined time is determined/set in advance to avoid occurrence of the temporary failure of power supply. Hereinafter, a process to generate braking force by the electric parking brake apparatus at one of the rear wheels (namely, the preceding brake wheel), and to thereafter generate braking force by the electric parking brake apparatus at the other of the rear wheels (namely, the succeeding brake wheel) will also be referred to as a "sequential brake process."

Therefore, according to the apparatus of the present disclosure, when the hydraulic brake apparatus fails while the EPB stop process is being executed, braking distance can be prevented from increasing as much as possible because the electric parking brake apparatus starts generating braking force. In addition, according to the apparatus of the present disclosure, the temporary failure of power supply can be avoided, since the sequential brake process is executed when the electric parking brake apparatus starts generating the braking force.

In one aspect of the apparatus of the present disclosure, the EPB stop process execution section is configured:

to execute a specific brake wheel selecting process when the EPB stop process execution section starts executing the specific brake process, the specific brake wheel selecting process being a process to select, as a "specific brake wheel," one from among the four wheels other than the hydraulic brake malfunction wheel (step 610 and step 645 of FIG. 6), to select, as the hydraulic brake release wheels, the rest of the four wheels other than the specific brake wheel (step 615 of FIG. 6), and to select, as the preceding brake wheel, one of a pair of the rear wheels opposing to the specific brake wheel in the lateral direction of the vehicle (step 620 of FIG. 6); and to stop generating the hydraulic braking force at the specific brake wheel when the EPB stop process execution section starts generating the EPB braking force to the succeeding brake wheel (step 720 of FIG. 7).

In the above aspect, braking force is generated at the specific brake wheel and at the preceding brake wheel during a time period from a time point at which the specific brake process is started to a time point at which the predetermined time period elapses. Subsequently, when the predetermined time period elapses from the time point at which the specific brake process is started, braking force is generated at the preceding brake wheel and at the succeeding brake wheel. In other words, in the present aspect, braking force is generated at one of the rightward wheels and at one of the leftward wheels, when the specific brake process is being executed.

Accordingly, deflection of braking force in the lateral direction (in the right and left direction) of the vehicle is reduced/smaller as compared to a case where braking force is generated only at wheels either in the right side or in the left side, whereby a likelihood that a direction of the vehicle (namely, a yaw angle of the vehicle) changes can be reduced. Hereinafter, a phenomenon that the direction of the vehicle changes due to the deflection of braking force in the lateral direction of the vehicle will also be referred to as a "vehicle deflection phenomenon." Namely, according to the present aspect, the likelihood that the vehicle deflection phenomenon occurs when the specific brake process is being executed can be reduced.

In addition, in the present aspect, preferably, the EPB stop process execution section is configured to select, as the specific brake wheel, one of the front wheels which is not determined to be the hydraulic brake malfunction wheel (step 610 of FIG. 6), if at least one of a pair of the front wheels is not determined to be the hydraulic brake malfunction wheel when executing the specific brake wheel selecting process ("Yes" determination in step 605 of FIG. 6).

According to the above aspect, if one of the front wheels is the specific brake wheel, braking force is generated at this front wheel (the specific brake wheel) and at one of the rear wheels (the preceding brake wheel, which is opposing to the specific brake wheel in the lateral direction), during the time period from the time point at which the specific brake process is started to the time point at which the predetermined time period elapses. In this case, a "possibility that driving stability of the vehicle is improved when a disturbance occurs (for example, strong crosswind which blows on the vehicle, and traveling of the vehicle into a puddle of water)" becomes higher as compared to the case in which braking force is generated at a pair of the rear wheels. Therefore, according to the above aspect, the "likelihood that the vehicle deflection phenomenon occurs during the time period from the time point at which the specific brake process is started to the time point at which the predetermined time period elapses" can be further reduced.

Further, in the present aspect, preferably, the EPB stop process execution section is configured to adjust a "magnitude of the hydraulic braking force generated at the specific brake wheel (a specific braking force Fs)" such that the magnitude becomes equal to or smaller than a "magnitude of the EPB braking force generated at the preceding brake wheel," when executing the specific brake process.

In general, the maximum magnitude of braking force generated by the hydraulic brake apparatus is greater than the maximum magnitude of braking force generated by the electric parking brake apparatus. If "braking force generated at the specific brake wheel by the hydraulic brake apparatus" is significantly greater than braking force generated at the preceding brake wheel by the electric parking brake apparatus, the likelihood that the vehicle deflection phenomenon occurs is higher as compared to a case where these braking forces are approximately equal to each other. Therefore, according to the above aspect, the "likelihood that the vehicle deflection phenomenon occurs during the time period from the time point at which the specific brake process is started to the time point at which the predetermined time period elapses" can be further reduced.

In another aspect of the apparatus of the present disclosure, the EPB stop process execution section is configured to select the four wheels as the hydraulic brake release wheels, if all of the four wheels are determined to be the hydraulic brake malfunction wheels ("No" determination in both of step 605 and step 640 of FIG. 6).

According to the above aspect, if all of the four wheels are determined to be the hydraulic brake malfunction wheels during a time period from a time point at which the EPB stop process is started to a time point at which the vehicle stops (stops moving), the apparatus of the present disclosure makes/lets the hydraulic brake apparatus stop generating braking force at the four wheels. Meanwhile, in this case, the above aspect of the apparatus of the present disclosure makes/lets the electric parking brake apparatus start generating braking force. Therefore, the above aspect of the apparatus can stop the vehicle as soon as possible, even when all of the four wheels are determined to be the hydraulic brake malfunction wheels.

Notably, in the above description, in order to facilitate understanding of the present disclosure, the constituent elements of the disclosure corresponding to those of an embodiment of the disclosure which will be described later are accompanied by parenthesized names and/or symbols which are used in the embodiment; however, the constituent elements of the disclosure are not limited to those in the embodiment defined by the names and/or the symbols. Other objects, other features, and attendant advantages of the present disclosure will be readily appreciated from the following description of the embodiment of the disclosure which is made with reference to the accompanying drawings.

BRIEF DESCRIPTION OF THE DRAWINGS

FIGS. 2(A)-2(D) are timing charts for explaining an EPB stop process, and a specific brake process in a case where a hydraulic brake capability wheel is not present, executed by the present control apparatus;

FIGS. 3(A)-3(D) are timing charts for explaining the specific brake process in a case where a hydraulic brake capability wheel is present executed by the present control apparatus;

DESCRIPTION OF THE EMBODIMENTS

Figure 1:
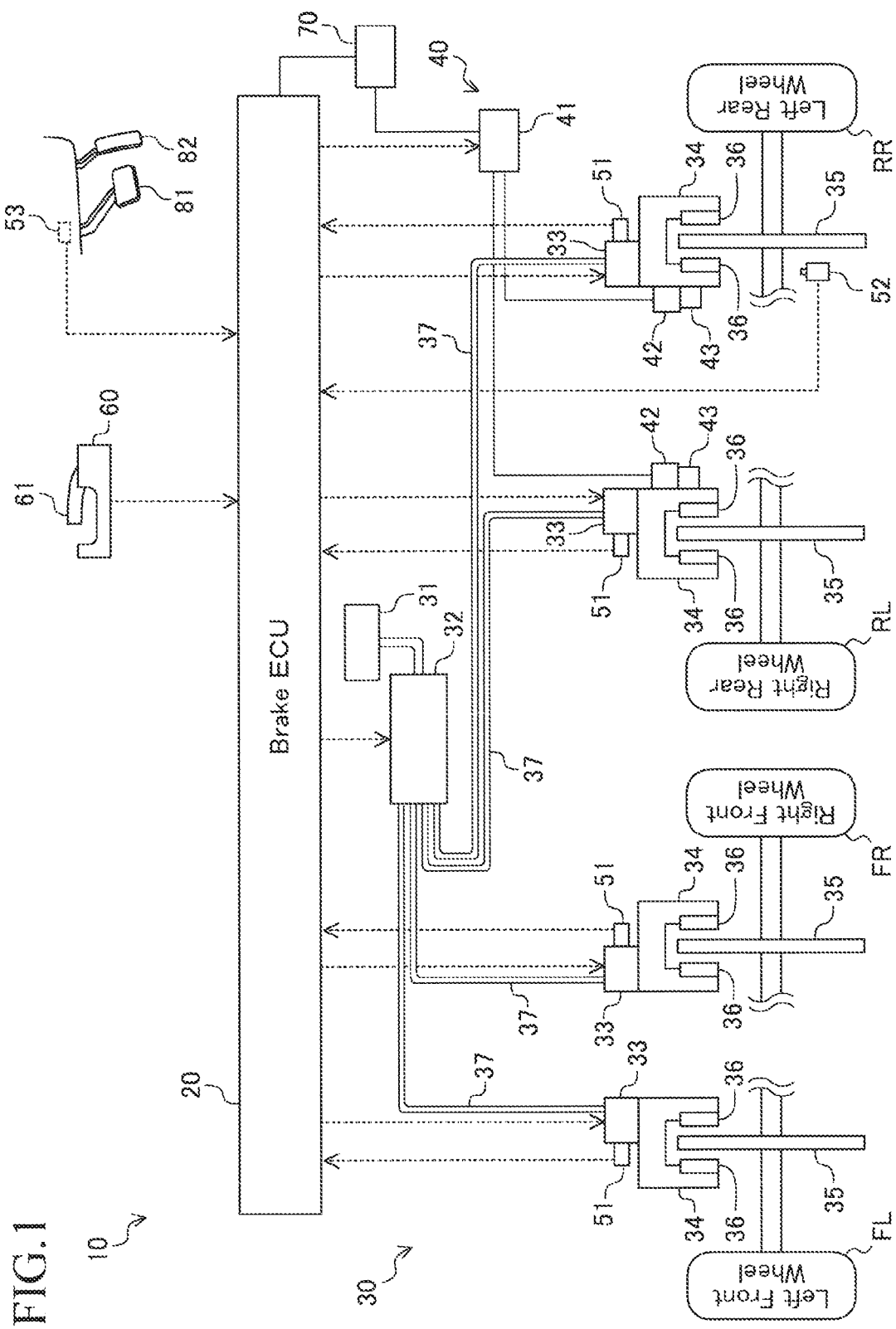
FIG. 1 is a schematic diagram of a vehicle on which a vehicle brake control apparatus according to an embodiment of the present disclosure (present control apparatus) is mounted.

A vehicle brake control apparatus according to an embodiment of the present disclosure (hereinafter also referred to as the "present control apparatus") will now be described with reference to the drawings. The present control apparatus is applied to a vehicle 10 shown in FIG. 1. The vehicle 10 includes a brake ECU 20, a hydraulic brake 30, an electric parking brake (EPB) 40, hydraulic oil pressure sensors 51, a vehicle speed sensor 52, a brake pedal sensor 53, an EPB switch 60, a storage battery 70, a brake pedal 81 and an accelerator pedal 82.

(Configuration—Brake ECU)

The brake ECU 20 is an electric control unit and includes a CPU, a ROM and a RAM. The CPU performs data reading, numerical computation, computation result output, etc. by repeatedly executing predetermined programs (routines). The ROM stores the programs executed by the CPU, lookup tables (maps), among other things. The RAM stores data temporarily.

The brake ECU 20 receives signals from the hydraulic oil pressure sensors 51, the vehicle speed sensor 52, the brake pedal sensor 53 and the EPB switch 60. The brake ECU 20 controls the hydraulic brake 30 and the EPB 40 as described later.

(Configuration—Hydraulic Brake)

The hydraulic brake 30 is a well-known disk brake apparatus which generates braking force on each of four wheels (namely, a right front wheel FR, a left front wheel FL, a right rear wheel RR and a left rear wheel RL) with which the vehicle 10 is equipped. The hydraulic brake 30 includes a reservoir tank 31, a master cylinder 32, hydraulic actuators 33, brake calipers 34, disk rotors 35 and pairs of brake pads 36.

The reservoir tank 31 reserves hydraulic oil (brake fluid). The master cylinder 32 supplies each of the hydraulic actuators 33 with the hydraulic oil reserved in the reservoir tank 31 via pipe conduits 37 in accordance with a direction from the brake ECU 20. The hydraulic actuators 33 regulate (control) pressures of hydraulic oil applied to the brake calipers 34.

Each of the disk rotors 35 rotates with the corresponding wheel (namely, any one of the right front wheel FR, the left front wheel FL, the right rear wheel RR and the left rear wheel RL). When the hydraulic actuators 33 increase pressure of the hydraulic oil applied to the brake caliper 34 in accordance with the direction from the brake ECU 20, a pair of the brake pads 36 press both sides of the disk rotor 35, whereby friction force which prevents rotation of the wheel (namely, brake force) is generated.

That is to say, the brake ECU 20 is configured to let/have each of the four wheels mounted on the vehicle 10 generate the braking force by means of controlling the hydraulic brake 30, thereby controlling an acceleration As of the vehicle 10 (an acceleration of the vehicle 10 which is a change amount of a "vehicle speed Vs which is the traveling speed of the vehicle 10" per unit time, and in this case, the acceleration As having a negative value).

Hereinafter, a state where the hydraulic brake 30 is functioning to generate the braking force (namely, a status where the brake pads 36 are pressing the disk rotors 35) will also be referred to as an "ON state" of the hydraulic brake 30. Meanwhile, a state where the hydraulic brake 30 is not functioning to generate the braking force (namely, a state where the brake pads 36 are not pressing the disk rotors 35) will also be referred to as an "OFF state" of the hydraulic brake 30.

(Configuration—Electric Parking Brake)

The EPB 40 is a well-known electric parking brake apparatus (an EPB apparatus) for each of the rear wheels (namely, the right rear wheel RR and the left rear wheel RL). The EPB 40 includes an electrical circuit 41, electrical motors 42 and pistons 43.

The electrical circuit 41 is supplied with electrical power from the storage battery 70. The storage battery 70 supplies electrical power to various electrical apparatuses mounted on the vehicle 10 (including the brake ECU 20) as well as the electrical circuit 41. The electrical circuit 41 regulates (controls) a voltage applied to the electrical motors 42. The electrical motor 42 and the piston 43 are connected with each other via a gear mechanism (not shown) respectively. Rotational motion of the electrical motors 42 is converted into linear reciprocating motion of the pistons 43 by the gear mechanisms.

When the electrical motors 42 rotate in a predetermined lock direction, the pistons 43 press the brake pads 36 such that the brake pads 36 press the disk rotors 35, thereby the braking force is generated. Since the pistons 43 are equipped with lock mechanisms (not shown), the EPB 40 can continue the generation of the braking force even when rotational torque of the electrical motors 42 in the lock direction becomes zero.

When the electrical motors 42 rotate in a release direction which is opposite direction to the lock direction, the press against the brake pads 36 by the pistons 43 is released, thereby stopping generating braking force.

Hereinafter, a state where the EPB 40 is functioning to generate the braking force (namely, a state where the pistons 43 are pressing the brake pads 36) will also be referred to as an "ON state" of the EPB 40. Meanwhile, a state where the EPB 40 is not functioning to generate the braking force (namely, a state where the pistons 43 are not pressing the brake pads 36) will also be referred to as an "OFF state" of the EPB 40.

(Configuration—Others)

Each of the hydraulic oil pressure sensors 51 detects a hydraulic oil pressure Pd which is a pressure of hydraulic oil which each of the hydraulic actuator 33 supplies the corresponding brake caliper 34 with, and outputs a signal indicative of the hydraulic oil pressure Pd. The vehicle speed sensor 52 detects the vehicle speed Vs and outputs a signal indicative of the vehicle speed Vs.

The brake pedal sensor 53 detects a brake pedal operation amount Bkp which is the operation amount of the brake pedal 81 and outputs a signal indicative of the brake pedal operation amount Bkp.

The accelerator pedal 82 is operated by a driver of the vehicle 10 so as to increase the acceleration As. Description about a control (processing) executed in response to an operation of the accelerator pedal 82, an actuator corresponding to the control, and so on is omitted in this specification.

The EPB switch 60 is arranged at a position adjacent to a shift lever (not shown) in a vehicle cabin of the vehicle 10 (namely, the EPB switch 60 is located near the shift lever). A switch knob 61 is provided on the EPB switch 60, which is operated by the driver of the vehicle 10.

The switch knob 61 can be switched between an OFF position and an ON position by operations of the driver. When the driver draws up the switch knob 61 in a state in which the switch knob 61 is in the OFF position, the switch knob 61 becomes in the ON position. Meanwhile, when the driver draws down the switch knob 61 in a state in which the switch knob 61 is in the ON position, the switch knob 61 becomes in the OFF position.

The EPB switch 60 outputs an ON signal (specifically, a high level signal) when the switch knob 61 is at the ON position. Meanwhile, the EPB switch 60 outputs an OFF signal (specifically, a low level signal) when the switch knob 61 is at the OFF position.

Hereinafter, an operation of switching the switch knob 61 from the OFF position to the ON position will also be referred to as an "ON operation" of the EPB 40. Meanwhile, an operation of switching the switch knob 61 from the ON position to the OFF position will also be referred to as an "OFF operation" of the EPB 40.

(Operation of Brake ECU)

Next, operation of the brake ECU 20 will be described. When the brake pedal 81 is stepped on (when the brake pedal 81 is operated), the brake ECU 20 determines magnitudes of braking force (namely, target braking force) to be generated at each of the four wheels (namely, the right front wheel FR, the left front wheel FL, the right rear wheel RR and the left rear wheel RL) based on the brake pedal operation amount Bkp, the vehicle speed Vs and so on. In addition, the brake ECU 20 controls the hydraulic brake 30 such that a magnitude of actual braking force generated by the hydraulic brake 30 becomes equal to the target braking force. That is to say, when the brake pedal 81 is stepped on, the brake ECU 20 controls the hydraulic brake 30 to the ON state.

Meanwhile, when the ON operation of the EPB switch 60 is performed in a state in which the EPB 40 is in the OFF state and the vehicle 10 is not traveling (namely, the vehicle speed Vs is "0"), the brake ECU 20 controls/sets the EPB 40 to the ON state. As a result, the stopped state of the vehicle 10 is maintained. In addition, when the OFF operation of the EPB switch 60 is performed in a state in which the EPB 40 is in the ON state, the brake ECU 20 controls/sets the EPB 40 to the OFF state.

It should be noted that the brake ECU 20 may be configured to control/set the EPB 40 to the OFF state when the OFF operation of the EPB switch 60 is performed in a state in which the EPB 40 is in the ON state and the brake pedal 81 is stepped on. Namely, in this case, the operation for the brake pedal 81 in addition to the operation for the EPB switch 60 is needed so as to switch the EPB 40 from the ON state to the OFF state.

Incidentally, when the electrical motors 42 start to rotate in the lock direction or the release direction (namely, the electrical circuit 41 starts to apply voltage to the electrical motors 42), excessive current (namely, a rush current) may flow into the electrical motors 42. Consequently, if both of the electrical motors 42 start to rotate at the same time, there is a possibility that the required total electrical power for each of the electrical motors 42 exceeds the amount of power which can be supplied from the storage battery 70. In that case, the "temporary failure of power supply," where the storage battery 70 becomes unable to supply power to electronical devices on the vehicle 10 (for example, the brake ECU 20) with stability, may occur.

In view of the forgoing, when the brake ECU 20 switches the EPB 40 between the OFF state and the ON state, the brake ECU 20 executes the "sequential brake process" to start rotating one of the electrical motors 42, and thereafter, start rotating the other of the electrical motors 42. More specifically, when the brake ECU 20 switches the EPB 40 from the OFF state to the ON state, the brake ECU 20 makes/lets the EPB 40 generate braking force at one of the right rear wheel RR and the left rear wheel RL at the beginning. This one of the right rear wheel RR and the left rear wheel RL is also referred to as a "preceding brake wheel" for convenience' sake.

When a predetermined time period Tint elapses after the start of generating the braking force at the preceding brake wheel, the brake ECU 20 makes/lets the EPB 40 generate braking force at the other of the right rear wheel RR and the left rear wheel RL. This other one of the right rear wheel RR and the left rear wheel RL is also referred to as a "succeeding brake wheel" for convenience' sake.

Similarly, when the brake ECU 20 switches the EPB 40 from the ON state to the OFF state, the brake ECU 20 makes/lets the EPB 40 stop generating braking force at one of the right rear wheel RR and the left rear wheel RL at the beginning. Subsequently, when the time period Tint elapses the brake ECU 20 makes/lets the EPB 40 stop generating braking force at the other of the right rear wheel RR and the left rear wheel RL.

(Operation of Brake ECU—EPB Stop Process)

When the ON operation of the EPB switch 60 is performed in a state in which the vehicle 10 is traveling/moving, the brake ECU 20 stops the vehicle 10 by use of braking force generated by the hydraulic brake 30. Subsequently, the brake ECU 20 controls/sets the EPB 40 to the ON state. Namely, the brake ECU 20 executes the above-mentioned EPB stop process.

Specific operation of the EPB stop process will be described with reference to the timing charts shown in FIGS. 2(A)-2(D). FIGS. 2(A)-2(D) are timing charts for illustrating respective changes with respect to time tin (A) operation states of the EPB switch 60, (B) operation states of the hydraulic brake 30, (C) the vehicle speed Vs, and (D) operation states of the EPB 40.

In FIGS. 2(A)-2(D), the leftmost end of the timing chart represents a time point t0. Time elapses as following to the right of the timing chart and time t becomes a time point t6 via a time point t1, a time point t2, a time point t3, a time point t4, and a time point t5 in this order. A time difference between the time point t2 and the time point t3 is equal to a time interval Tint (namely, t3−t2=Tint). In addition, a time difference between the time point t4 and the time point t5 is equal to the time interval Tint (namely, t5−t4=Tint).

A solid line L1 of FIG. 2(A) represents operation states of the EPB switch 60 (namely, whether the switch knob 61 is at the ON position or at the OFF position). As understood from the solid line L1, the switch knob 61 is switched from the OFF position to the ON position at the time point t1 by the driver of the vehicle 10. Namely, the ON operation of the EPB switch 60 is performed at the time point t1.

Each of a solid line L2a to a solid line L5a represents a magnitude of braking force generated by the hydraulic brake 30 at each of the right front wheel FR, the left front wheel FL, the right rear wheel RR, and the left rear wheel RL, respectively. As understood from the solid line L2a to the solid line L5a, the brake ECU 20 makes/lets the hydraulic brake 30 start generating braking force at each of the four wheels of the vehicle 10 at the time point t1.

After that time, the magnitudes of braking force generated by the hydraulic brake 30 at each of the wheels reach predetermined magnitudes of braking force. Specifically, the magnitude of braking force generated by the hydraulic brake 30 at the right front wheel FR becomes a braking force $f_{FR1}$, and the magnitude of braking force generated by the hydraulic brake 30 at the left front wheel FL becomes a braking force $f_{FL1}$. Similarly, the magnitude of braking force generated by the hydraulic brake 30 at the right rear wheel RR becomes a braking force $f_{RR1}$, and the magnitude of braking force generated by the hydraulic brake 30 at the left rear wheel RL becomes a braking force $f_{RL1}$. In this example, the braking force $f_{FR1}$, the braking force $f_{FL1}$, the braking force $f_{RR1}$, and the braking force $f_{RL1}$ are equal to each other.

A solid line L6 of FIG. 2(C) represents the vehicle speed Vs. As understood from the solid line L6, the vehicle speed Vs decreases after the time point t1 as the result of the generation of braking force by the hydraulic brake 30, and thereafter, the vehicle speed Vs becomes "0" at the time point t4.

Each of a solid line L7a and a solid line L8a represents a magnitude of braking force generated by the EPB 40 at each of the right rear wheel RR and the left rear wheel RL respectively. As understood from the solid line L7a, when the vehicle speed Vs becomes "0" (namely, when the vehicle 10 stops), the brake ECU 20 makes/lets the EPB 40 start generating braking force at the right rear wheel RR. Subsequently, the magnitude of braking force generated by the EPB 40 at the right rear wheel RR becomes a braking force $f_{RR2}$.

Further, the brake ECU 20 makes/lets the EPB 40 start generating braking force at the left rear wheel RL at the time point t5, when the time interval Tint elapses after the stat timing of generating braking force at the right rear wheel RR (namely, the time point t4).

Subsequently, as understood from the solid line L2a to the solid line L5a, the brake ECU 20 makes/lets the hydraulic brake 30 stop generating braking force at the time point t6 (namely, after the vehicle 10 stops). Namely, the brake ECU 20 finishes the EPB stop process.

(Operation of Brake ECU—Specific Brake Process)

Incidentally, during a time period from a time point at which the EPB stop process is started (namely, from the beginning of the EPB stop process) to a time point at which the vehicle 10 stops (namely, while the hydraulic brake 30 is being in the ON state), there is a possibility that failure of any one or more components of the hydraulic brake 30 occurs.

For example, when the brake ECU 20 becomes unable to receive a signal from any one of the hydraulic oil pressure sensors 51, the brake ECU 20 determines that "failure of a component included in the hydraulic brake 30 which corresponds to that hydraulic oil pressure sensor 51" occurs and whereby the hydraulic brake 30 cannot generate required braking force at the wheel corresponding to that hydraulic oil pressure sensor 51.

A wheel among the four wheels (namely, the left front wheel FL, the right front wheel FR, the right rear wheel RR and the left rear wheel RL) corresponding to the failure of the hydraulic brake 30 is also referred to as a "hydraulic brake malfunction wheel" for convenience' sake. In other words, the hydraulic brake malfunction wheel is a wheel at which the hydraulic brake 30 cannot generate required braking force. Meanwhile, a wheel among the four wheels of the vehicle 10 which is not determined to be the hydraulic brake malfunction wheel is also referred to as a "hydraulic brake capability wheel" for convenience' sake.

In addition, when the hydraulic oil pressure Pd detected by the hydraulic oil pressure sensors 51 corresponding to one of the hydraulic actuator 33 is greatly different from an expected value in a state in which the brake ECU 20 controls that hydraulic actuators 33, the brake ECU 20 determines that the wheel corresponding to that hydraulic oil pressure sensors 51 is the hydraulic brake malfunction wheel.

Further, if the brake ECU 20 determines that malfunction of a control processing executed by the brake ECU 20 for the hydraulic brake 30 (namely, internal processing failure) occurs, the brake ECU 20 determines that all of the wheels of the vehicle 10 are the hydraulic brake malfunction wheels. For example, a target braking force of the hydraulic brake 30 determined by the brake ECU 20 for any one of the four wheels exceeds a maximum braking force which the hydraulic brake 30 is designed to generate, the brake ECU 20 determines that the internal processing failure occurs.

If any one of the wheels of the vehicle 10 is determined to be the hydraulic brake malfunction wheel during a time period from the start of the EPB stop process to the stop of the vehicle 10, the brake ECU 20 executes a "specific brake process" to control/set the EPB 40 to the ON state.

An initiation condition of the specific brake process is also referred to as a "specific condition" for convenience' sake. When both of the following conditions (a) and (b) are satisfied during the time period from the start of the EPB stop process to the stop of the vehicle 10, the specific condition is satisfied.

Condition (a): Any one or more of the wheels of the vehicle 10 is/are determined to be the hydraulic brake malfunction wheel.

Condition (b): The EPB 40 cannot start generating braking force at both of the right rear wheel RR and the left rear wheel RL at the same time (namely, the sequential brake process is executed when the EPB 40 is switched from the OFF state to the ON state).

In the present embodiment, when the EPB 40 is switched from the OFF state to the ON state, the sequential brake process is executed. Therefore, the condition (b) is always satisfied.

(Specific Brake Process—No Hydraulic Brake Capability Wheel is Present)

First, the specific brake process executed in a state in which the hydraulic brake capability wheel is not present (namely, all of the wheels of the vehicle 10 are determined to be the hydraulic brake malfunction wheels during a time period from the start of the EPB stop process to the stop of the vehicle 10) will be described.

In this case, the brake ECU 20 makes/lets the hydraulic brake 30 stop generating braking force at the four wheels. In addition, the brake ECU 20 controls/sets the EPB 40 to the ON state. This process will be described more specifically with reference to FIGS. 2(A)-2(D). In the example of FIGS. 2(A)-2(D), at the time point t2, the four wheels of the vehicle 10 are determined to be the hydraulic brake malfunction wheels and whereby the specific condition is satisfied.

In this case, as indicated by a broken line L2b to a broken line L5b in FIG. 2(B), the brake ECU 20 makes/lets the hydraulic brake 30 stop generating braking force at the time point t2. Hereinafter, a wheel at which the hydraulic brake 30 stops generating braking force when the specific brake process is started will be also referred to as a "hydraulic brake release wheel." In this case, all of the four wheels of the vehicle 10 are the hydraulic brake release wheels.

Meanwhile, as indicated by a broken line L7b in FIG. 2(D), the brake ECU 20 makes/lets the EPB 40 start generating braking force at the right rear wheel RR (namely, the preceding brake wheel in the present example) at the time point t2.

Afterward, at the time point t3 after elapse of the time interval Tint from the time point t2, as indicated by a broken line L8b, the brake ECU 20 makes/lets the EPB 40 start generating braking force at the left rear wheel RL (namely, the succeeding brake wheel in the present example). As a result, as indicated by a broken line L6b in FIG. 2(C), the vehicle speed Vs becomes "0" at a time point t4b after the time point t4.

(Specific Brake Process—Hydraulic Brake Capability Wheel is Present)

Next, the specific brake process executed in a state in which the hydraulic brake capability wheel is present (namely, a part of the wheels of the vehicle 10 are determined to be the hydraulic brake malfunction wheels during a time period from the start of the EPB stop process to the stop of the vehicle 10) will be described.

In this case, the brake ECU 20 selects a "specific brake wheel" which is one of the hydraulic brake capability wheels, and the preceding brake wheel. Further, the brake ECU 20 controls the hydraulic brake 30 such that the magnitude of braking force generated at the specific brake wheel becomes a specific braking force Fs. A selection method of the specific brake wheel and the preceding brake wheel, and a determination method of the specific braking force Fs will be described later.

Meanwhile, the brake ECU 20 makes/lets the hydraulic brake 30 stop generating braking force at the wheels other than the specific brake wheel. Namely, in this case, the brake ECU 20 selects the wheels other than the specific brake wheel as the hydraulic brake release wheels. Further, the brake ECU 20 makes/lets the EPB 40 start generating braking force at the preceding brake wheel.

Subsequently, when the time period Tint elapses, the brake ECU 20 makes/lets the EPB 40 start generating braking force at the succeeding brake wheel. Further, the brake ECU 20 makes/lets the hydraulic brake 30 stop generating braking force at the specific brake wheel.

The selection method of the specific brake wheel and the preceding brake wheel will next be described. If at least one of the pair of the front wheels (namely, the left front wheel FL and the right front wheel FR) is the hydraulic brake capability wheel, the brake ECU 20 selects the one of the front wheels which is the hydraulic brake capability wheel as the specific brake wheel. Meanwhile, if both of the front wheels are the hydraulic brake malfunction wheels, the brake ECU 20 selects one of the rear wheels (namely, the right rear wheel RR and the left rear wheel RL) which is the hydraulic brake capability wheel as the specific brake wheel. This selection method of the specific brake wheel and the preceding brake wheel described here is also referred to as a "specific brake wheel selecting process" for convenience' sake.

Further, the brake ECU 20 selects the preceding brake wheel such that the preceding brake wheel is opposing to the specific brake wheel in the lateral direction of the vehicle 10. For example, when the right front wheel FR or the right rear wheel RR is the specific brake wheel, the brake ECU 20 select the left rear wheel RL as the preceding brake wheel. In contrast, when the left front wheel FL or the left rear wheel RL is the specific brake wheel, the brake ECU 20 selects the right rear wheel RR as the preceding brake wheel.

The determination method of the specific braking force Fs will next be described. The brake ECU 20 determines the specific braking force Fs based on a preceding braking force Fp which is the magnitude of braking force generated at the preceding brake wheel by the EPB 40. Specifically, the brake ECU 20 determines the specific braking force Fs in accordance with the following Equation (1).

$$Fs = Dp/Ds \times Fp \qquad (1)$$

In Equation (1), a preceding brake wheel distance Dp is a distance in the lateral direction of the vehicle 10 between a barycentric position of the vehicle 10 and a force application point of the preceding brake wheel. A specific brake wheel distance Ds is a distance in the lateral direction of the vehicle 10 between the barycentric position of the vehicle 10 and the force application point of the specific brake wheel.

The brake ECU 20 stores distances (force application points distances) between the barycentric position of the vehicle 10 and the force application points of each of the four wheels (namely, the left front wheel FL, the right front wheel FR, the right rear wheel RR, and the left rear wheel RL) in the lateral direction in the ROM, respectively. The brake ECU 20 refers to two from among the four force application point distances as the preceding brake wheel distance Dp and the specific brake wheel distance Ds when the brake ECU 20 executes the specific brake process.

For example, when the right rear wheel RR is the preceding brake wheel and the left front wheel FL is the specific brake wheel, the preceding brake wheel distance Dp is the distance in the lateral direction between a barycentric position of the vehicle 10 and the force application point of the right rear wheel RR. In addition, the specific brake wheel distance Ds is the distance in the lateral direction between a barycentric position of the vehicle 10 and the force application point of the left front wheel FL.

In another case, when the left rear wheel RL is the preceding brake wheel and the right rear wheel RR is the specific brake wheel, the preceding brake wheel distance Dp is the distance in the lateral direction between a barycentric position of the vehicle 10 and the force application point of the left rear wheel RL. In addition, the specific brake wheel distance Ds is the distance in the lateral direction between a barycentric position of the vehicle 10 and the force application point of the right rear wheel RR.

An example of the specific brake process executed by the brake ECU 20 in a case where the hydraulic brake capability wheels are present is illustrated in FIGS. 3(A)-3(D). In the example of FIGS. 3(A)-3(D), operation states of the EPB switch 60 is indicated by the solid line L1 in common with the example of the FIGS. 2(A)-2(D). In addition, in the example of FIGS. 3(A)-3(D), change of the vehicle speed Vs is indicated by the solid line L6 in common with the example of the FIGS. 2(A)-2(D) for convenience' sake.

First, the case in which the specific brake wheel is one of the front wheels (specifically, the left front wheel FL) will be described. In this case, the right rear wheel RR is the preceding brake wheel. Each of a solid line L2c to a solid line L5c in FIG. 3(B) represents the magnitude of braking force generated by the hydraulic brake 30. Meanwhile, each of a solid line L7c and a solid line L8c in FIG. 3(D) represents the magnitude of braking force generated by the EPB 40.

As understood from the solid line L3c, when the specific condition is satisfied at the time point t2, the brake ECU 20 controls the hydraulic brake 30 such that the magnitude of braking force at the left front wheel FL (namely, the specific brake wheel) becomes equal to a braking force $f_{FL3}$ which is the specific braking force Fs obtained based on the Equation (1) described above.

In addition, as understood from the solid line L2c, L4c and L5c, the brake ECU 20 makes/lets the hydraulic brake 30 stop generating braking force at the right front wheel FR, the right rear wheel RR, and the left rear wheel RL (namely, the hydraulic brake release wheels). Further, as understood from the solid line L7c, the brake ECU 20 makes/lets the EPB 40 start generating braking force at the right rear wheel RR (namely, the preceding brake wheel).

Afterward, at the time point t3 after elapse of the time interval Tint from the time point t2, the brake ECU 20 makes/lets the hydraulic brake 30 stop generating braking force at the left front wheel FL (namely, the specific brake wheel). In addition, as understood from the solid line L8c, the brake ECU 20 makes/lets the EPB 40 start generating braking force at the left rear wheel RL (namely, the succeeding brake wheel).

Next, the case in which the specific brake wheel is one of the rear wheels (specifically, the left rear wheel RL) will be described. In this case, the right rear wheel RR is the preceding brake wheel. Each of a broken line L2d to a broken line L5d in FIG. 3(B) represents the magnitude of braking force generated by the hydraulic brake 30. Meanwhile, each of a broken line L7d and a broken line L8d in FIG. 3(D) represents the magnitude of braking force generated by the EPB 40.

As understood from the broken line L5d, at the time point t2, the brake ECU 20 controls the hydraulic brake 30 such that the magnitude of braking force at the left rear wheel RL (namely, the specific brake wheel) becomes equal to a braking force $f_{FL4}$ which is the specific braking force Fs obtained based on the Equation (1) described above.

In addition, as understood from the broken line L2d to the broken line L4d, the brake ECU 20 makes/lets the hydraulic brake 30 stop generating braking force at the right front wheel FR, the left front wheel FL, and the right rear wheel RR (namely, the hydraulic brake release wheels). Further, as understood from the broken line L7d, the brake ECU 20 makes/lets the EPB 40 start generating braking force to the right rear wheel RR (namely, the preceding brake wheel).

Afterward, at the time point t3 after elapse of the time interval Tint from the time point t2, the brake ECU 20 makes/lets the hydraulic brake 30 stop generating braking force at the left rear wheel RL (namely, the specific brake wheel). In addition, as understood from the broken line L8d, the brake ECU 20 makes/lets the EPB 40 start generating braking force at the left rear wheel RL (namely, the succeeding brake wheel).

(Reason why Front Wheels are Given Preference/Priority when Selecting the Specific Brake Wheel)

As described above, during execution of the specific brake process, if both of the pair of the front wheels are not the hydraulic brake malfunction wheels, the brake ECU 20 selects the one of the front wheels which is the hydraulic brake capability wheel as the specific brake wheel. Namely, at the selection of the specific brake wheel, the front wheels are given priority over the rear wheels. The reason why the front wheels are given priority over the rear wheels as the specific brake wheels will next be described.

If the front wheel is the specific brake wheel, braking force continues being generated at the front wheel (namely, the specific brake wheel) and the rear wheel (namely, the preceding brake wheel) until the time period Tint elapses from the start of the specific brake process. Subsequently, braking force is generated at a pair of the rear wheels (namely, the preceding brake wheel and the succeeding brake wheel). On the other hand, if the rear wheel is the specific brake wheel, braking force is generated at one of the rear wheels (namely, the specific brake wheel and the succeeding brake wheel) and the other one (namely, the preceding brake wheel). Namely, if the front wheel is the specific brake wheel, time period when braking force is generated only at the pair of the rear wheels (namely, the left and right rear wheels) becomes shorter as compared to the case in which the rear wheel is the specific brake wheel.

In general, when braking force is generated at "one of the front wheels" and at "the rear wheel which is opposing to this front wheel in the lateral direction (a diagonal rear wheel)," the possibility that driving stability (running stability) of a vehicle will be improved (enhanced) becomes higher as compared to the case in which braking force is generated at a pair of the rear wheels. More specifically, if a magnitude of the total force of "the frictional force in the traveling direction (in the front and rear direction) of a wheel" and "the frictional force in the lateral direction of the wheel" acting between the wheel and road surface becomes larger than the maximum frictional force which has a relationship with a frictional coefficient defined by a combination of the wheel and the road surface, a slip (skid) between the wheel and the road surface will occur. Further, in this case, a "brake lock" which is a phenomenon that the rotation of the wheel is stopped by braking force generated at the wheel may also occur.

Hence, for example, when the vehicle 10 receives crosswind (namely, when the frictional force in the lateral direction of the wheel increases) in a state in which braking force is generated at the wheel (namely, the frictional force in the traveling direction of the wheel increases), the slip (or the brake lock) may easily occur as compared to the case in which the braking force is not generated at the wheel. Therefore, for example, when the vehicle 10 receives crosswind in a state in which braking force is generated at a pair of the rear wheels, the slip (or the brake lock) of the rear wheels may easily occur as compared to the case in which the braking force is generated only at one of the rear wheel. On the other hand, when braking force is generated at only one of the front wheels and at only one of the rear wheels, even in the case the vehicle 10 receives crosswind, the slip (or the brake lock) on the rear wheel will be less likely to occur as compared to the case in which the braking force is generated at a pair of the rear wheels.

In other cases, when the vehicle 10 travels into a puddle of water on road surface (namely, when the frictional coefficient defined by a combination of the wheel and road surface becomes lower) in a state in which braking force is generated at only one of the front wheels and at only one of the rear wheels, the slip (or the brake lock) of the rear wheel will be less likely to occur as compared to the case in which the braking force is generated at a pair of the rear wheels. In other words, if braking force is generated at one of the front wheels and the diagonal rear wheel, "the possibility that driving stability of the vehicle 10 will be improved in the case where disturbance (strong crosswind, traveling into a puddle of water and so on) occurs" becomes higher as compared to the case in which braking force is generated at a pair of the rear wheels.

In view of the forgoing, the brake ECU 20 gives priority to the front wheels over the rear wheels when selecting the specific brake wheel in order to improve driving stability of the vehicle 10 during the time period from a time point at which the specific brake process is started to a time point at which the time period Tint elapses from the start of the specific brake process.

(Specific Operation)

Next, specific operation of the brake ECU 20 will be described. The CPU of the brake ECU 20 (hereinafter also referred to as "the CPU" for simplification) repeatedly executes an "EPB stop process routine" represented by a flowchart shown in FIG. 4. Specifically, when a predetermined time period elapses after the completion of execution of the present routine, the CPU starts executing the present routine again.

Each of an EPB stop process execution flag Xes, and a specific brake process execution flag Xoe is set to "0" in an initialization routine (not shown) which is executed by the CPU when the brake ECU 20 is started (namely, when an unillustrated ignition key switch of the vehicle 10 is moved from an OFF position to an ON position). The values of those flags are set and referred in the present routine (and other routines described later). When the EPB stop process is in execution, the value of the EPB stop process execution flag Xes is set to "1." Meanwhile, when the specific brake process is in execution, the value of the specific brake process execution flag Xoe is set to "1."

Figure 4:
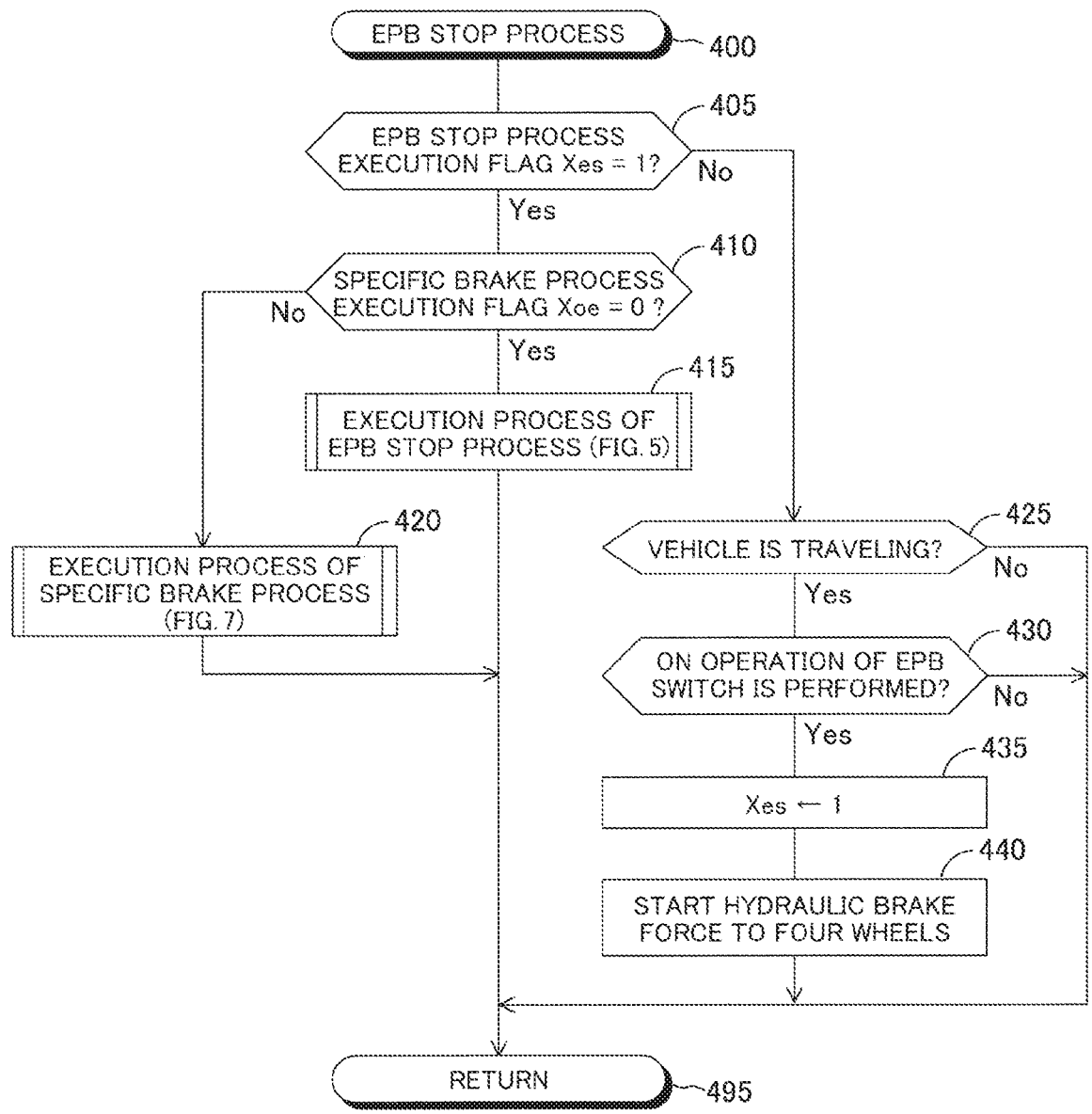
FIG. 4 is a flowchart representing an EPB stop process routine executed by the present control apparatus.

When an appropriate timing has come, the CPU starts the process from step 400 of FIG. 4 and proceeds to step 405 so as to determine whether or not the value of the EPB stop process execution flag Xes is "1."

(Case A) In a case where the vehicle 10 is traveling/moving and the ON operation of the EPB switch 60 is not performed It is now assumed that the vehicle 10 is traveling/moving, and the ON operation of the EPB switch 60 has not been performed yet after the vehicle 10 starts traveling/moving.

In this case, since the value of the EPB stop process execution flag Xes is "0," the CPU makes a "No" determination in step 405 and proceeds to step 425. In step 425, the CPU determines whether or not the vehicle 10 is traveling/moving (specifically, whether or not the vehicle speed Vs is greater than a predetermined threshold).

According to the assumption described above, the vehicle 10 is traveling/moving, and thus, the CPU makes a "Yes" determination in step 425 and proceeds to step 430 so as to determine whether or not the ON operation of the EPB switch 60 has been performed since the present routine was executed last time.

According to the assumption described above, the ON operation of the EPB switch 60 has not been performed, and thus, the CPU makes a "No" determination in step 430 and proceeds to step 495 directly so as to end the present routine.

(Case B) In a case where the ON operation of the EPB switch 60 is performed while the vehicle 10 is traveling/moving It is assumed that the ON operation of the EPB switch 60 is performed while the vehicle 10 is traveling/moving afterwards. Namely, it is assumed that the present point in time is the time point t1 in the timing charts of FIGS. 2(A)-2(D). In the present assumption, it is also assumed that failure of the hydraulic brake 30 is not detected (namely, the hydraulic brake malfunction wheel is not detected) while the EPB stop process is in execution, and the OFF operation of the EPB switch 60 is not performed during a time period from the start of the EPB stop process to the stop of the vehicle 10.

In this case, the CPU makes a "Yes" determination in step 430 and proceeds to step 435 so as to set the value of the EPB stop process execution flag Xes to "1." Subsequently, the CPU proceeds to step 440 so as to control the hydraulic brake 30 such that braking force is generated at each of the four wheels (namely, the left front wheel FL, the right front wheel FR, the right rear wheel RR, and the left rear wheel RL). Further, the CPU proceeds to step 495.

Subsequently, when the present routine is executed again, since the value of the EPB stop process execution flag Xes is "1," the CPU makes a "Yes" determination in step 405 and proceeds to step 410. In step 410, the CPU determines whether or not the value of the specific brake process execution flag Xoe is "0."

At the present point in time (namely, a point in time shortly after execution of the EPB stop process is started), since the value of the specific brake process execution flag Xoe is "0," the CPU makes a "Yes" determination in step 410 and proceeds to step 415. In step 415, the CPU executes an "execution process of the EPB stop process routine" represented by a flowchart shown in FIG. 5.

Figure 5:
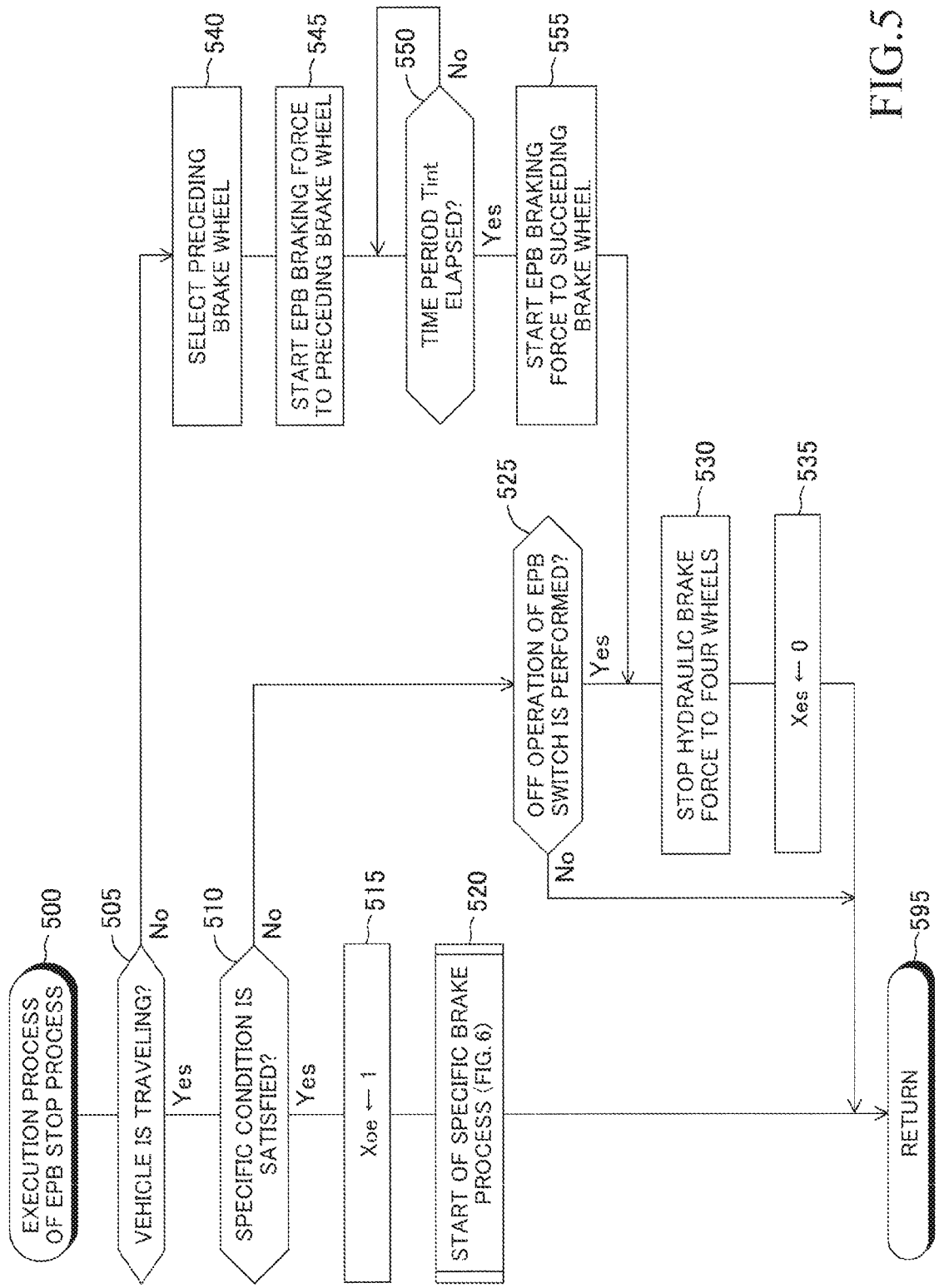
FIG. 5 is a flowchart representing an execution process of the EPB stop process routine executed by the present control apparatus.

Specifically, the CPU starts the process from step 500 of FIG. 5 and proceeds to step 505 so as to determine whether or not the vehicle 10 is traveling/moving through executing the process similar to the process in step 425. According to the assumption described above, the vehicle 10 is traveling/moving, and thus, the CPU makes a "Yes" determination in step 505 and proceeds to step 510 so as to determine whether or not the specific condition described above is satisfied.

According to the assumption described above, the hydraulic brake malfunction wheel has not been detected, and thus, the specific condition is not satisfied. Therefore, the CPU makes a "No" determination in step 510 and proceeds to step 525. In step 525, the CPU determines whether or not the OFF operation of the EPB switch 60 has been performed after the last execution of the routine of FIG. 4.

According to the assumption described above, the OFF operation of the EPB switch 60 has not been performed, and thus, the CPU makes a "No" determination in step 525 and proceeds to step 595 directly so as to end the present routine. Subsequently, the CPU ends the process of step 415 and proceeds to step 495.

Afterward, the vehicle speed Vs decreases because of braking force generated by the hydraulic brake 30, and then, the vehicle 10 stops. When the routine of FIG. 4 is executed for the first time after the stop of the vehicle 10 (namely, the present point in time is the time point t4 in the timing charts of FIGS. 2(A)-2(D)), the CPU proceeds from step 415 of FIG.4 to step 505 of FIG.5 and makes a "No" determination in step 505, then proceeds to step 540.

In step 540, the CPU selects the preceding brake wheel. In this case, the CPU may select any one of the right rear wheel RR and the left rear wheel RL as the preceding brake wheel. Subsequently, the CPU proceeds to step 545 so as to make/let the EPB 40 generate braking force at the preceding brake wheel.

Further, the CPU proceeds to step 550 so as to determine whether or not the time period Tint has elapsed after the process in step 545. If the time period Tint has not elapsed, the CPU makes a "No" determination in step 550 and executes the process in step 550 again. Meanwhile, if the time period Tint has elapsed, the CPU makes a "Yes" determination in step 550 and proceeds to step 555 so as to make/let the EPB 40 start generating braking force at the succeeding brake wheel.

Subsequently, the CPU proceeds to step 530 so as to make/let the hydraulic brake 30 stop generating the braking force at the four wheels. In addition, the CPU proceeds to step 535 so as to set the value of the EPB stop process execution flag Xes to "0." Further, the CPU proceeds to step 595.

(Case C) In a case where the OFF operation of the EPB switch 60 is performed during execution of the EPB stop process It is assumed that the OFF operation of the EPB switch 60 is performed during a time period from a time point at which the EPB stop process is started to a time point at which the vehicle 10 actually stops.

In this case, the CPU makes a "Yes" determination in step 525 and proceeds to 530. As a result, execution of the EPB stop process is aborted.

(Case D) In a case where the four wheels are detected as the hydraulic brake malfunction wheels during execution of the EPB stop process It is assumed that all of the four wheels (namely, the left front wheel FL, the right front wheel FR, the right rear wheel RR, and the left rear wheel RL) are detected as the hydraulic brake malfunction wheels during the time period from a time point at which the EPB stop process is started to a time point at which the vehicle 10 actually stops.

In this case, since the specific condition is satisfied, the CPU makes a "Yes" determination in step 510 and proceeds to step 515 so as to set the value of the specific brake process execution flag Xoe to "1." Subsequently, the CPU proceeds to step 520. In step 520, the CPU executes a "specific brake start process routine" represented by a flow shown chart in FIG. 6.

Figure 6:
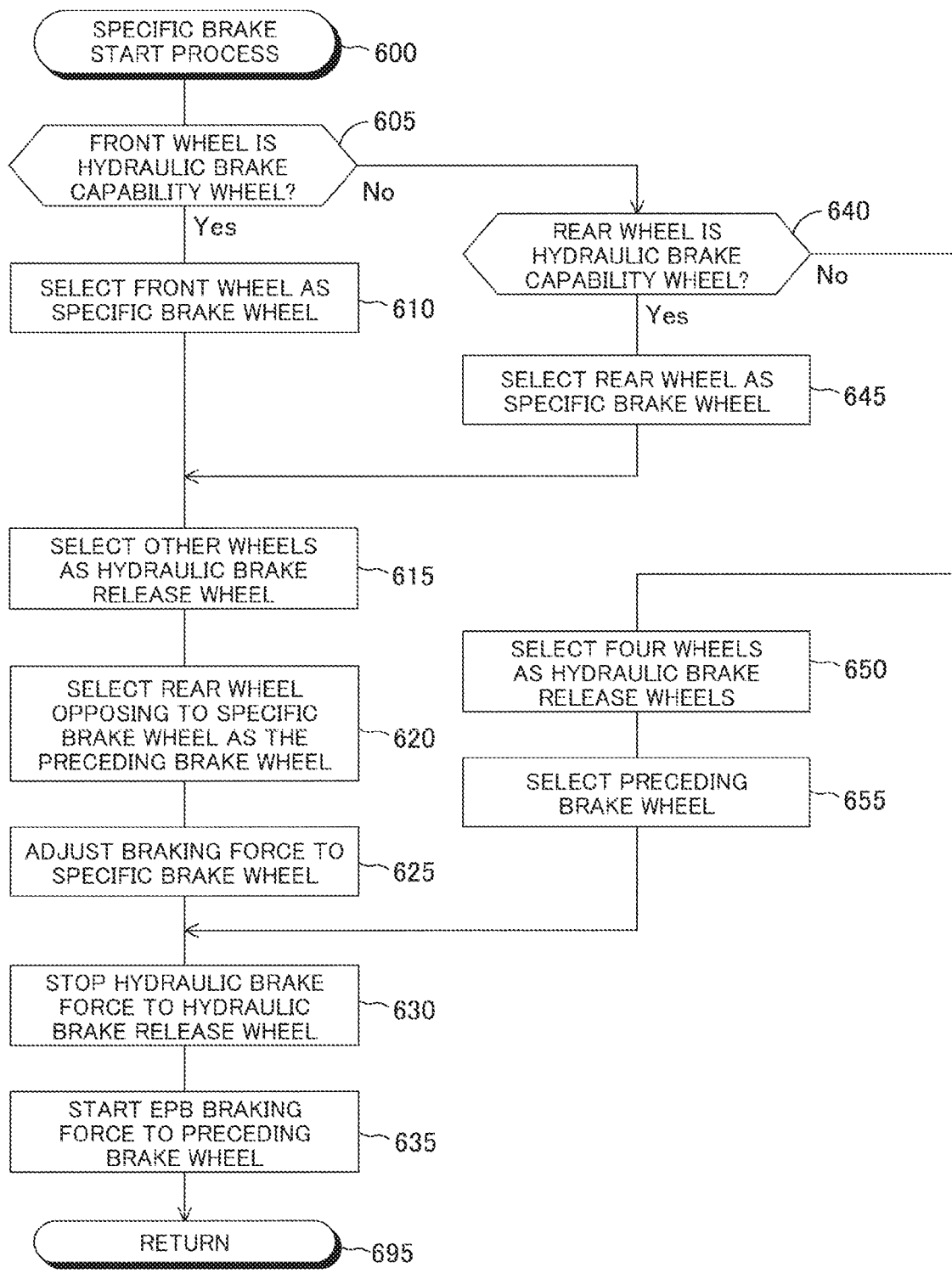
FIG. 6 is a flowchart representing a specific brake start process routine executed by the present control apparatus.

Specifically, the CPU starts the process from step 600 of FIG. 6 and proceeds to step 605 so as to determine whether or not at least one of a pair of the front wheels (namely, the left front wheel FL and the right front wheel FR) is the hydraulic brake capability wheel. According to the assumption described above, all of the four wheels are detected as the hydraulic brake malfunction wheels (namely, neither the left front wheel FL nor the right front wheel FR is the hydraulic brake capability wheel), and thus, the CPU makes a "No" determination in step 605 and proceeds to step 640.

In step 640, the CPU determines whether or not at least one of a pair of the rear wheels (namely, the right rear wheel RR and the left rear wheel RL) is the hydraulic brake capability wheel. According to the assumption described above, neither the right rear wheel RR nor the left rear wheel RL is the hydraulic brake capability wheel, and thus, the CPU makes a "No" determination and proceeds to step 650.

When the CPU proceeds to step 650, the CPU executes processes from step 650, step 655, step 630, and 635 described below sequentially, and then proceeds to step 695.

Step 650: the CPU selects all of the four wheels of the vehicle 10 as the hydraulic brake release wheels.

Step 655: the CPU selects the preceding brake wheel by executing the process similar to the process in step 540 of FIG. 5.

Step 630: the CPU makes/lets the hydraulic brake 30 stop generating braking force at the hydraulic brake release wheel(s).

Step 635: the CPU makes/lets the EPB 40 start generating braking force at the preceding brake wheel.

When the CPU proceeds to step 695, the CPU ends the routine of FIG. 6, and then, the CPU ends the process of step 520 of FIG. 5. Further, the CPU proceeds to step 595.

Afterward, when the routine of FIG. 4 is executed again, since the value of the specific brake process execution flag Xoe is "1," the CPU makes a "No" determination in step 410 and proceeds to step 420. In step 420, the CPU executes an "execution process of the specific brake process routine" represented by a flow shown chart in FIG. 7.

Figure 7:
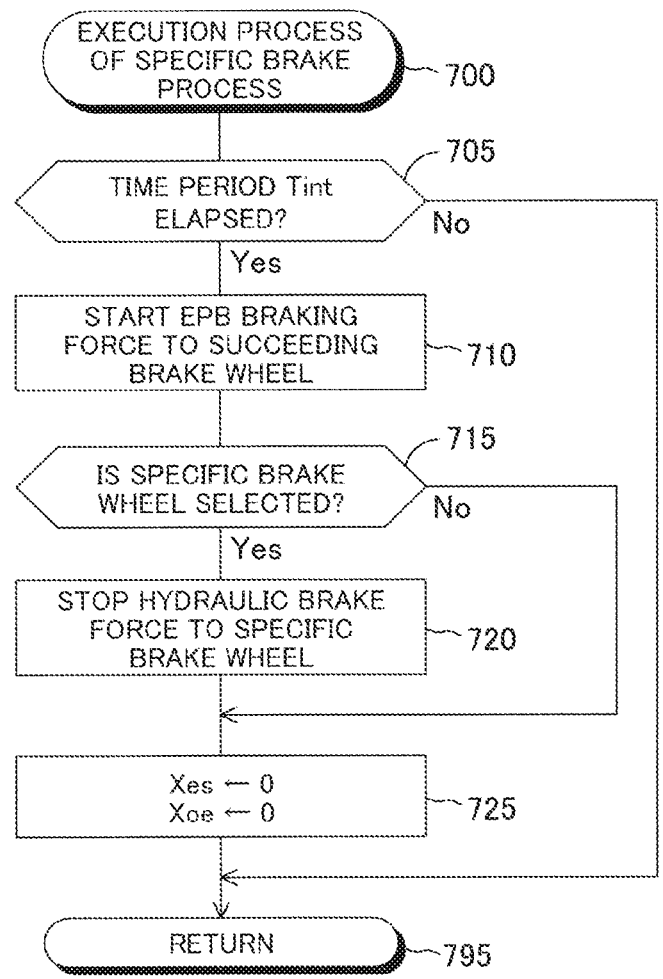
FIG. 7 is a flowchart representing an execution process of the specific brake process routine executed by the present control apparatus.

Specifically, the CPU starts the process from step 700 of FIG. 7 and proceeds to step 705 so as to determine whether or not the time period Tint has elapsed after the specific brake process is started (namely, after the routine of FIG. 6 is executed).

If the time period Tint has not elapsed, the CPU makes a "No" determination in step 705 and proceeds to step 795 directly. In this case, the CPU ends the routine of FIG. 7, and then, the CPU ends the process of step 420 of FIG. 4. Further, the CPU proceeds to step 495.

Afterward, when the time period Tint has elapsed (namely, the present point in time is the time point t3 in the timing charts of FIGS. 2(A)-2(D)), the CPU makes a "Yes" determination in step 705 of FIG. 7 and proceeds to 710. In step 710, the CPU makes/lets the EPB 40 start generating braking force at the succeeding brake wheel.

Subsequently, the CPU proceeds to step 715 so as to determine whether or not the specific brake wheel has already been selected (specifically, processes of step 610 or step 645 of FIG. 6 described later has already been executed or not). According to the assumption described above, the CPU has made "No" determination in each of step 605 and step 640 (namely, the specific brake wheel has not been selected yet), and thus, the CPU makes a "No" determination in step 715 and proceeds to step 725 directly.

In step 725, the CPU sets each of the value of the EPB stop process execution flag Xes, and the value of the specific brake process execution flag Xoe to "0" respectively. Subsequently, the CPU proceeds to step 795.

(Case E) In a case where (only) one of the wheels is detected as the hydraulic brake malfunction wheel during execution of the EPB stop process It is assumed that the right front wheel FR is detected as the hydraulic brake malfunction wheel during the time period from a time point at which the EPB stop process is started to a time point at which the vehicle 10 actually stops.

In this case, since the left front wheel FL is the hydraulic brake capability wheel, the CPU makes a "Yes" determination in step 605 of FIG. 6 and proceeds to step 610 so as to select, as the specific brake wheel, one of the front wheels which is the hydraulic brake capability wheel (according to the assumption described above, the left front wheel FL). Subsequently, the CPU proceeds to step 615 so as to select, as the hydraulic brake release wheel, the wheels other than the specific brake wheel (according to the assumption described above, the right front wheel FR, the right rear wheel RR, and the left rear wheel RL).

In addition, the CPU proceeds to step 620 so as to select, as the preceding brake wheel, the rear wheel which is opposing to the specific brake wheel in the lateral direction of the vehicle 10 (according to the assumption described above, the right rear wheel RR). Further, the CPU proceeds to step 625 so as to control the hydraulic brake 30 such that the magnitude of braking force generated at the specific brake wheel becomes equal to the specific braking force Fs. Subsequently, the CPU proceeds to step 630.

Afterward, when the routine of FIG. 4 is executed for the first time in a state in which the time interval Tint has elapsed, the CPU proceeds to step 715 after executing the processes in step 420 of FIG. 4 and in step 700 to step 710 of FIG. 7. In step 715, the CPU makes a "Yes" determination and proceeds to step 720 so as to make/let the hydraulic brake 30 stop generating braking force at the specific brake wheel. Subsequently, the CPU proceeds to step 725.

(Case F) In a case where both of the front wheels are detected as the hydraulic brake malfunction wheels during execution of the EPB stop process It is assumed that both of the left front wheel FL and the right front wheel FR are detected as the hydraulic brake malfunction wheels during the time period from a time point at which the EPB stop process is started to a time point at which the vehicle 10 actually stops.

In this case, since both of the right rear wheel RR and the left rear wheel RL are the hydraulic brake capability wheels, the CPU makes a "Yes" determination in step 640 of FIG. 6 and proceeds to step 645 so as to select, as the specific brake wheel, one of the rear wheels which are the hydraulic brake capability wheels. According to the assumption described above, either the right rear wheel RR or the left rear wheel RL can be selected as the specific brake wheel and, for example, the right rear wheel RR is selected. Subsequently, the CPU proceeds to step 615.

Thus far, the specific operation of the brake ECU 20 has been described with reference to the flowcharts in FIG. 4 to FIG. 7. It should be noted that the CPU makes a "No" determination in step 425 and proceeds to step 495 directly when the CPU proceeds to step 425 in a state in which the value of the EPB stop process execution flag Xes is "0" and the vehicle 10 is not traveling/moving.

As having been described above, according to the present control apparatus, occurrence of the phenomenon that the braking distance becomes longer due to a detection of failure in the hydraulic brake 30 (and satisfaction of the specific condition as the result of the detection of the failure) during execution of the EPB stop process is avoided as much as possible. In addition, occurrence of the temporary failure of power supply can be avoided, since the sequential brake process is executed. Further, according to the present control apparatus, a possibility that the vehicle deflection phenomenon occurs during execution of the specific brake process can be reduced.

The embodiment of the vehicle brake control apparatus according to the present disclosure has been described; however, the present disclosure is not limited to the above-described embodiment, and various modifications are possible without departing from the scope of the disclosure. For example, the EPB 40 according to the present embodiment generates braking force by use of the brake pad 36 as a "friction material" and the disk rotor 35 as a "material subjected to friction" in common with the hydraulic brake 30. However, the EPB 40 may use another pair of the friction material and the material subjected to friction than the pair of the brake pad 36 and the disk rotor 35 so as to generate braking force.

For example, the EPB 40 may use a drum which rotates with the wheel of the vehicle 10 as the material subjected to friction, and a brake shoe which is pressed to an inner surface of the drum as the friction material. In this case, the EPB 40 may be configured such that the brake shoe is connected to an electrical motor by a driving wire and the brake shoe is pressed to the inner surface of the drum by tension of the driving wire which is increased by torque generated by the electrical motor.

In addition, the brake ECU 20 according to the present embodiment executes the sequential brake process every time the brake ECU 20 switches the EPB 40 between the ON state and the OFF state. Namely, the condition (b) described above is satisfied at all times. However, the brake ECU 20 may execute the sequential brake process only when a predetermined condition is satisfied. For example, the brake ECU 20 may be configured such that the brake ECU 20 executes the sequential brake process only when a remaining capacity SOC (stored electrical energy) of the storage battery 70 is lower than a predetermined threshold Pth. In this case, the condition (b) is satisfied when the remaining capacity SOC is lower than the threshold Pth.

In addition, the brake ECU 20 according to the present embodiment controls the hydraulic brake 30 such that "braking force which is equal to the specific braking force Fs obtained based on the above-described Equation (1)" is generated at the specific brake wheel when the brake ECU 20 executes the specific brake process. However, the brake ECU 20 may control the hydraulic brake 30 such that "braking force which is less than the specific braking force Fs obtained based on the above-described Equation (1)" is generated at the specific brake wheel when the brake ECU 20 executes the specific brake process.

In other cases, the above-described process where the hydraulic brake 30 is controlled based on the specific braking force Fs may be omitted. For example, the brake ECU 20 may control the hydraulic brake 30 such that braking force which is equal to "braking force which is generated at the specific brake wheel during a time period from the beginning of the EPB stop process to the beginning of the specific brake process" is generated at the specific brake wheel when the brake ECU 20 executes the specific brake process.

In addition, both of the hydraulic brake 30 and the EPB 40 according to the present embodiment are controlled by the brake ECU 20. However, the hydraulic brake 30 and the EPB 40 may be controlled by mutually different ECUs respectively.

In addition, the brake ECU 20 according to the present embodiment stores the force application points distances of the four wheels (namely, the left front wheel FL, the right front wheel FR, the right rear wheel RR, and the left rear wheel RL) in the ROM, respectively, in advance. However, the brake ECU 20 may obtain (estimate) the barycentric position of the vehicle 10 based on parameters which represent traveling status of the vehicle 10 (see, for example, WO2013/042245) and obtain the force application points distance of each of the four wheels based on the obtained barycentric position.

In addition, the EPB switch 60 according to the present embodiment is equipped with the switch knob 61 which is switched between the OFF position and the ON position. However, the EPB switch 60 may be configured in a different way from this. For example, the EPB switch 60 may be equipped with a push button such that the ON operation and the OFF operation of the EPB switch 60 are performed alternately every time the driver of the vehicle 10 pushes the push button. In other cases, the EPB switch 60 may be arranged at a dashboard of the vehicle 10 (not shown) and configured such that the ON operation is performed when the driver draws down a knob of the EPB switch 60, and the OFF operation is performed when the driver draws up the knob.

What is claimed is:

1. A vehicle brake control apparatus applied to a vehicle which is equipped with a hydraulic brake apparatus capable of generating braking force at each of four wheels consisting of a pair of right and left front wheels and a pair of right and left rear wheels and an electric parking brake apparatus capable of generating braking force at each of a pair of said rear wheels, comprising:
    an operation switch which is disposed at a position where a driver of said vehicle can reach and with which said driver can perform a predetermined ON operation;
    a braking control section configured to control hydraulic braking force and EPB braking force, said hydraulic braking force being generated by said hydraulic brake apparatus, and said EPB braking force being generated by said electric parking brake apparatus; and
    an EPB stop process execution section configured to execute an EPB stop process when said ON operation is performed while said vehicle is moving, said EPB stop process being a process to generate a predetermined magnitude of said hydraulic braking force at each of said four wheels, and to generate said EPB braking force at each of a pair of said rear wheels after said vehicle stops moving; wherein
    said EPB stop process execution section is configured to start executing a specific brake process when at least one of said four wheels is determined to be a hydraulic brake malfunction wheel during a time period from a time point at which said EPB stop process is started to a time point at which said vehicle stops moving, said specific brake process including a first process executed when said specific brake process is started and a second process executed when a predetermined time period elapses after the first process is started, said first process being a process to start generating said EPB braking force at a preceding brake wheel and to stop generating said hydraulic braking force at one or more of hydraulic brake release wheels including said hydraulic brake malfunction wheel, said second process being a process to start generating said EPB braking force at a succeeding brake wheel, said hydraulic brake malfunction wheel being a wheel at which said hydraulic brake apparatus cannot generate the predetermined magnitude of said hydraulic braking force, said preceding brake wheel being one of a pair of said rear wheels, and said succeeding brake wheel being the other of a pair of said rear wheels.

2. The vehicle brake control apparatus according to claim 1, wherein
    said EPB stop process execution section is configured:
    to execute a specific brake wheel selecting process when said EPB stop process execution section starts executing said specific brake process, said specific brake wheel selecting process being a process to select, as a specific brake wheel, one from among said four wheels other than said hydraulic brake malfunction wheel, to select, as said hydraulic brake release wheels, the rest of said four wheels other than said specific brake wheel, and to select, as said preceding brake wheel, one of a pair of said rear wheels opposing to said specific brake wheel in the lateral direction of said vehicle; and
    to stop generating said hydraulic braking force at said specific brake wheel when said EPB stop process execution section starts generating said EPB braking force to said succeeding brake wheel.

3. The vehicle brake control apparatus according to claim 2, wherein
    said EPB stop process execution section is configured to select, as said specific brake wheel, one of said front wheels which is not determined to be said hydraulic brake malfunction wheel, if at least one of a pair of said front wheels is not determined to be said hydraulic brake malfunction wheel when executing said specific brake wheel selecting process.

4. The vehicle brake control apparatus according to claim 3, wherein
    said EPB stop process execution section is configured to adjust a magnitude of said hydraulic braking force generated at said specific brake wheel such that said magnitude becomes equal to or smaller than a magnitude of said EPB braking force generated at said preceding brake wheel, when executing said specific brake process.

5. The vehicle brake control apparatus according to claim 2, wherein
    said EPB stop process execution section is configured to adjust a magnitude of said hydraulic braking force generated at said specific brake wheel such that said magnitude becomes equal to or smaller than a magnitude of said EPB braking force generated at said preceding brake wheel, when executing said specific brake process.

6. The vehicle brake control apparatus according to claim 1, wherein
    said EPB stop process execution section is configured to select said four wheels as said hydraulic brake release wheels, if all of said four wheels are determined to be said hydraulic brake malfunction wheels.

* * * * *